United States Patent [19]

Cerda

[11] Patent Number: 5,038,461

[45] Date of Patent: Aug. 13, 1991

[54] DEVICE AND SYSTEM FOR CRIMPING CONNECTING ELEMENTS ON ELECTRIC CONDUCTORS

[75] Inventor: Léon G. Cerda, Carry-Le-Rouet, France

[73] Assignee: Societe Nationale Industrielle et Aerospatiale, Paris, France

[21] Appl. No.: 575,337

[22] Filed: Aug. 30, 1990

[30] Foreign Application Priority Data

Aug. 31, 1989 [FR] France .............................. 89 11445

[51] Int. Cl.[5] .............................................. B23P 19/00

[52] U.S. Cl. ........................................ 29/753; 72/402; 72/452

[58] Field of Search .................... 29/753; 72/402, 452, 72/861, 862, 863, 871

[56] References Cited

U.S. PATENT DOCUMENTS

| | | | |
|---|---|---|---|
| 2,863,342 | 12/1958 | Appel et al. | 72/452 X |
| 2,905,031 | 9/1959 | Appel et al. | 72/452 X |
| 2,974,367 | 3/1961 | Doering et al. . | |
| 3,059,310 | 10/1962 | Appel | 72/452 X |
| 3,183,704 | 5/1965 | Smith | 72/452 X |
| 4,041,766 | 8/1977 | Johnson et al. | 29/753 X |
| 4,255,692 | 3/1981 | Livera | 72/402 X |
| 4,464,917 | 8/1984 | Kienhöfer | 72/402 X |

FOREIGN PATENT DOCUMENTS

| | | |
|---|---|---|
| 2063643 | 7/1971 | France . |
| 946605 | 1/1964 | United Kingdom . |

*Primary Examiner*—Carl J. Arbes
*Attorney, Agent, or Firm*—Marshall, O'Toole, Gerstein, Murray & Bicknell

[57] ABSTRACT

A device is disclosed for comprising connecting elements on electric conductors, which device comprises:

a punch-carrying member (4) with a plurality of sets of n punches (4*C*) movable radially with respect to the electric conductor about which said pin to be crimped is disposed;

a first piece (5) mounted on said punch-carrying member and comprising radially movable pushers (5*C*), said first piece being movable with respect to said punch-carrying member by first actuating means (10), so as to bring the pushers (5*C*) opposite the chosen set of punches (4*C*); and a second piece (6) mounted on said first piece (5) and having means (6*B*) for moving said pushers (5*C*), representative of the crimping force to be exerted by the punches, said second piece (6) being movable with respect to the first piece and to the punch-carrying member by second actuating means (11), so that the movement means (6*B*) act on the pushers (5*C*) which, in their turn, act on the punches (4*C*) so as to obtain crimping of the element on the electric conductor.

19 Claims, 6 Drawing Sheets

20B
23
22
8B
8D
8C
8K
8J
8F
22B
22A
8
8A
8E
8G
8H
3
4C
4F
5C
6
5
6C
4
20
22B
8E
4A
16A
16
16B
6D
5A
5F
1
5D
XIV
7A
7
7D
7F
7E
7B

DEVICE AND SYSTEM FOR CRIMPING CONNECTING ELEMENTS ON ELECTRIC CONDUCTORS

The present invention relates to a device for crimping connecting elements on electric conductors, and an automatic crimping system comprising such a device.

More particularly, the device of the invention is intended, for example, for crimping pins on the ends of the electric conductors of previously bared cables.

Although not exclusively, the crimping device finds a particular appropriate application in the aeronautics field, where the multitude of electric and electronic equipment required for piloting an aircraft and for carrying out the different missions involves numerous electric connections of various types.

By way of example, in a helicopter, the number of electric connections between the different pieces of equipment may be of the order of 12000, which represents, besides more than 50 kilometres of cables, more than 35000 operations for processing the ends of the electric cables per apparatus and so as many connections.

This end processing is, for the most part, carried out by crimping a pin of a generally cylindrical shape on the electric conductor of the cable whose end has been previously bared. The conductors are then grouped together through connectors for connection between the different pieces of equipment or for passing through the walls of the aircraft. Thus, depending particularly on the intensity of the electric currents used and on the geometry of the conductors, recourse is had to a wide variety of pins (length, diameter, position of the crimping imprints, . . . ) and of adapted electric conductors (diameter, depth of the crimping imprints, . . . ).

For crimping pins on the ends of electric conductors, at the present time different manual crimpers are used, each comprising a given type of crimping punch and covering the range of pins to be used.

In addition, for satisfactory mechanical crimping, each crimper comprises means for adjusting both the depth of penetration of the crimping punch as a function of the pin-conductor connection to be obtained and axial penetration of the pin with respect to the end of the electric conductor for suitably placing the shank to be crimped of the pin under the crimping punches of the crimper.

Thus, because of the multiplicity of pins and cables used, as well as the different crimpers required and the adjustments to be made thereto, the result is consequently the risk of errors, which may be in particular due either to the use of a wrong crimper, or to incorrect adjustment of the crimping parameters.

Now, since checking of all the crimping carried out is difficult to control as a whole, inappropriate crimping may not be detected.

Thus, such incorrect crimping risks causing, during flight of the aircraft, a loss of information at the piloting post or a loss of control of a piece of equipment with more or less serious consequences.

Furthermore, besides such potential risks of errors, all the crimping operations require considerable time and numerous staff.

The purpose of the present invention is to overcome these drawbacks.

For this, the device for crimping connecting elements, such as pins, on electric conductors is remarkable, in accordance with the invention, in that it comprises:

a punch-carrying member with a plurality of sets of n punches movable radially with respect to the electric conductor about which said pin to be crimped is disposed;

a first piece mounted on said punch-carrying member and comprising radially movable pushers, said first piece being movable with respect to said punch-carrying member by first actuating means, so as to bring the pushers opposite the chosen set of punches; and a second piece mounted on said first piece and having means for moving said pushers representative of the crimping force to be exerted by the punches, said second piece being movable with respect to the first piece and to the punch-carrying member by second actuating means, so that the movement means act on the pushers which, in their turn, act on the punches so as to obtain crimping of the pin on the electric conductor.

Thus, with the invention, the risks of errors due to the wrong choice of a crimper are overcome, since the device incorporates a plurality of sets of n punches required for carrying out crimping as a function of the dimensional characteristics of the pins of the electric conductors.

In a preferred embodiment, said punch-carrying member and said first and second pieces each have a general cylindrical shape, while being disposed concentrically with respect to each other, said second piece surrounding the first one, which surrounds said punch-carrying member.

According to another characteristic of the device, removable locking means may be provided between the first and second pieces for locking the two pieces together, when said locking means are active, for selecting the set of punches by the first actuating means and, when said locking means are inactive, for disengaging the two pieces so as to allow movement of the second piece, by the second actuating means, with respect to the first piece and the punch-carrying member.

Preferably, the first and second actuating means of respectively the first and second pieces comprise, for example, motors of electric type.

Thus, the rotatory movement of the first piece by the motor of the first actuating means may be achieved by means of an endless screw, connected to said motor and meshing with a corresponding toothed sector formed at the periphery of said first piece and the rotary movement of the second piece by the motor of the second actuating means may be achieved by means of a sliding rod of said motor, connected by its free end and about an axis to a radial lug projecting from said second piece.

In an advantageous embodiment, the sets of punches are disposed in the same radial plane while being evenly spaced apart angularly with respect to each other and the n punches of each set are also spaced evenly apart angularly from each other. Thus, the crimping forces exerted by the punches are evenly spaced apart about the shank of the pin to be crimped on its conductor.

In a preferred embodiment, the n punches of each set are housed in respective radial passages provided in said member, said punches being able to occupy a retracted position, through the action of resilient return means, and an extended position under the action of the respective pushers, corresponding to the operation of crimping the pin on the electric conductor. As for the pushers, they may be housed in radial passages formed in said first piece, said pushers cooperating, by one of their ends, with the movement means provided on the second piece and, by their opposite end, with said punches of the chosen set.

In a particularly interesting embodiment, said means for moving said pushers and punches are defined by profiled recesses formed in said second piece and receiving the corresponding ends of said pushers so that, during the rotary movement of the second piece, the profiled recesses progressively drive the pushers which act simultaneously on the punches, the crimping imprint obtained depending on the rotary movement of the recesses on the pushers.

According to another characteristic of the invention, the device comprises means for centring the pins, as a function of their diameter, with respect to the punch-carrying member, said centring means being controllable under the action of third actuating means.

In a particular embodiment, said centring means comprise two disks coaxial with said punch-carrying member, one of which is fixed whereas the other may be movable in rotation via the third actuating means, said mobile disc being provided with arcuate apertures in which are respectively engaged pins of elements able to slide in radial grooves formed in the fixed disc. Thus, by acting on the third actuating means, the elements move radially, via the pins transforming the circular movement into a linear movement, so as to be brought to the desired diameter, in order to centre the pin-conductor connection and hold it in position with respect to the punch-carrying member.

In addition, two groups of n arcuate apertures are provided, these apertures being spaced apart equiangularly with respect to each other, the first group of apertures ensuring centring of the pins having a diameter between 0.5 mm and 4 mm by the movement of the corresponding elements, whereas the second group of apertures completes centring of the pins having a diameter between 2 mm and 4 mm by the other elements.

Preferably, the third actuating means comprise an electric motor whose shaft is connected to a radial lug extending the mobile disc, via a pin.

According to another characteristic of the invention, the device further comprises means for adjusting the pins in depth, as a function of their length, in the punch-carrying member and controllable by fourth actuating means.

These adjustment means may for example comprise a hollow cylindrical guide intended to be introduced coaxially, in said punch-carrying member, by the fourth actuating means, and a rod disposed inside the guide and having a centring cone for said pins, said guide being able to slide with respect to said rod so as to come, by a stop provided in the guide, against said rod when the adjustment is correct.

Said fourth actuating means may be formed by a linear electric motor whose control rod is connected coaxially to said cylindrical guide.

The present invention also relates to a system for the automatic crimping of connecting elements on electric conductors.

For this, the system for automatic crimping of connecting elements, such as pins, on electric conductors is remarkable, in accordance with the invention, in that it comprises:

at least one crimping device such as defined above; and a programmable control unit containing the dimensional data and crimping parameters relative to the different types of conductors and pins to be used and to which said actuating means, said locking means are connected as well as means for maintaining each pin in the defined position and for triggering the crimping operation according to a programmed cycle.

Thus, after identification of the electric conductor present, the unit, as a function of the dimensional data of the conductor and of the pin, automatically determines the crimping parameters and the set of punches to be used. The whole of the crimping therefore takes place automatically, while avoiding the risks of errors mentioned above.

In addition, a sensor representative of the crimping force may be associated with the second piece while being connected to said second actuating means, so as to interrupt the crimping operation when the force exerted by the punches is reached, an electric connection connecting said sensor to said unit.

The figures of the accompanying drawings will better show how the invention may be implemented. In these figures, identical references designate similar elements.

Figure 1:
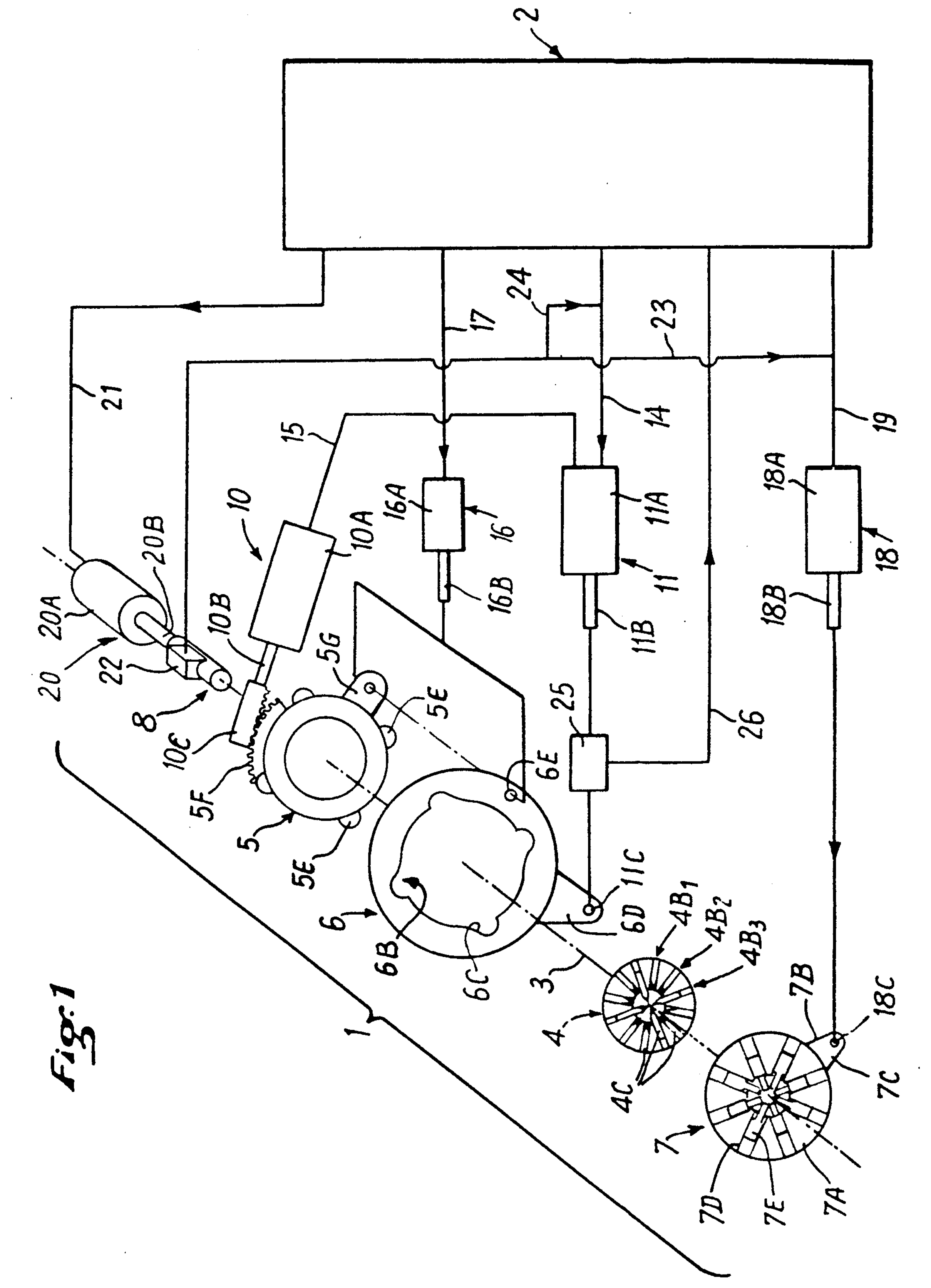
FIG. 1 shows a schematic exploded view of the automatic crimping system of the invention, comprising the crimping device and a programmable control unit.

Referring to FIG. 1, the system for the automatic crimping of connecting elements, such as pins, on electric conductors comprises a crimping device 1 associated with a programmable control unit 2. This unit 2 contains all the dimensional information or data relative to the different electric conductors and pins likely to be used, as well as all the parameters relative to the crimping operation between each of the pin-conductor connections to be formed. As will be seen hereafter, a previously established programme makes possible the execution of the operating cycle allowing total automation of the crimping to be obtained by means of actuating means connected to the device.

In the particular embodiment illustrated schematically in this Figure, device 1 comprises, coaxially with a longitudinal axis 3, a cylindrical punch-carrying member 4, a first piece 5 of cylindrical shape surrounding the punch-carrying member 4, a second piece 6 of cylindrical shape surrounding the first cylindrical piece 5, means 7 for centring the pins with respect to the punch-carrying member and means 8 for depth adjustment of said pins.

Furthermore, first actuating means 10 cooperate with the first piece 5 to allow a rotary movement thereof with respect to the punch-carrying member 4 and second actuating means 11 act on the second piece 6 so as to allow rotary movement thereof with respect to the first piece 5 and the punch-carrying member 4. The second actuating means 11 are connected by connection 14 to the control unit 2, whereas the first actuating means 10 are connected by connection 15 to the second actuating means 11. Removable locking means 16, which will be described subsequently, between the first 5 and second 6 pieces are also provided, connected by a connection 17 to unit 2. In addition, third actuating means 18, connected by a connection 19 to unit 2, control the pin centring means 7, and fourth actuating means 20, connected by a connection 21 to unit 2, control the means 8 for depth adjustment of the pins. The system also comprises means 22 for triggering the crimping cycle, which are associated with means 8. These triggering means 22 are connected, by a connection 23, to connection 19 connected to the unit and, by a connection 24, to the connection 14 connected to the unit. Finally, a sensor 25 is advantageously provided, between the second actuating means 11 and the second piece 6, representing the crimping force to be exerted and connected, by a connection 26, to the programmable control unit 2.

Figure 2:
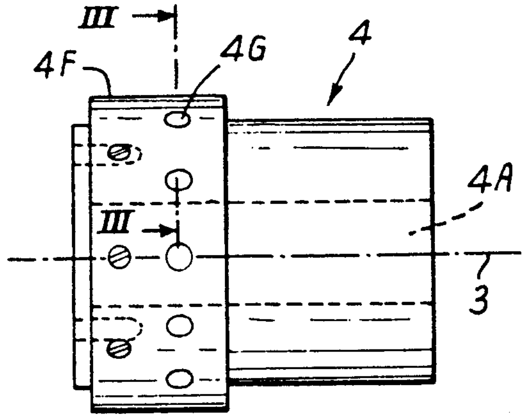
FIG. 2 is a side view of the punch-carrying member of the device.
Figure 3:
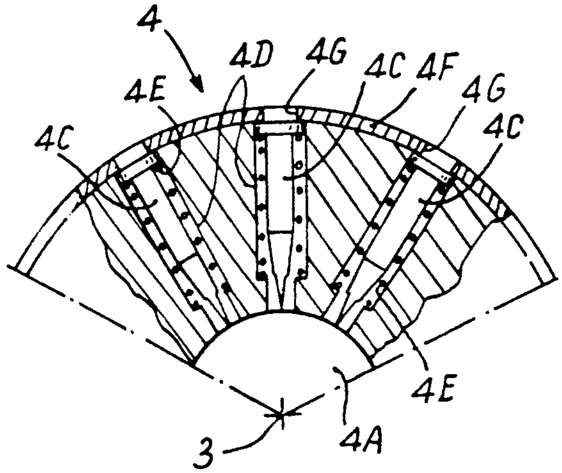
FIG. 3 is partial section on an enlarged scale of the punch-carrying member through line III—III of FIG. 2.

Referring to FIGS. 1, 2 and 3, the cylindrical punch-carrying member 4 has an axial through passage 4A and is equipped with a plurality of sets of n punches movable radially to axis 3. In this embodiment, member 4 comprises three sets $4B_1 4B_2$, and $4B_3$ of four punches 4C each disposed in the same plane, each set $4B_1$, $4B_2$ and $4B_3$ being evenly offset by 30° with respect to each other, whereas the four punches 4C of each set are spaced apart evenly angularly by 90° with respect to each other. Although that does not appear in the Figures, the shape of the ends of the punches of the sets is different depending on the type of crimping to be performed.

It can be seen more particularly in FIG. 3 that each crimping punch 4C is housed in a radial passage 4D formed in member 4. The punches of each set are able to occupy two end positions. A first retracted position, such as that illustrated in FIGS. 3, 13 and 14, the punches being held in this position through the action of resilient return springs 4E which surround them, by abutting against a ring 4F disposed about said cylindrical member 4. Orifices 4G are formed in the ring, in correspondence with punches 4C, so as to allow the free passage of pushers equipping the first piece, as will be seen hereafter. The orifices 4G have a smaller diameter than the punches. In the FIGS. 1, 15 and 16, a set of punches has been shown in the second extended position corresponding to crimping properly speaking of the pin on the electric conductor.

Figure 4:
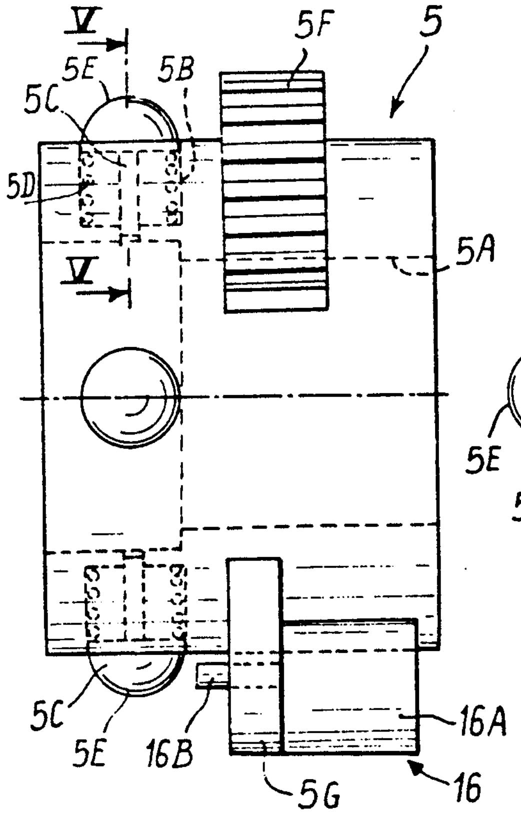
FIG. 4 shows a side view of the first piece of the device, which surrounds the punch-carrying member.
Figure 5:
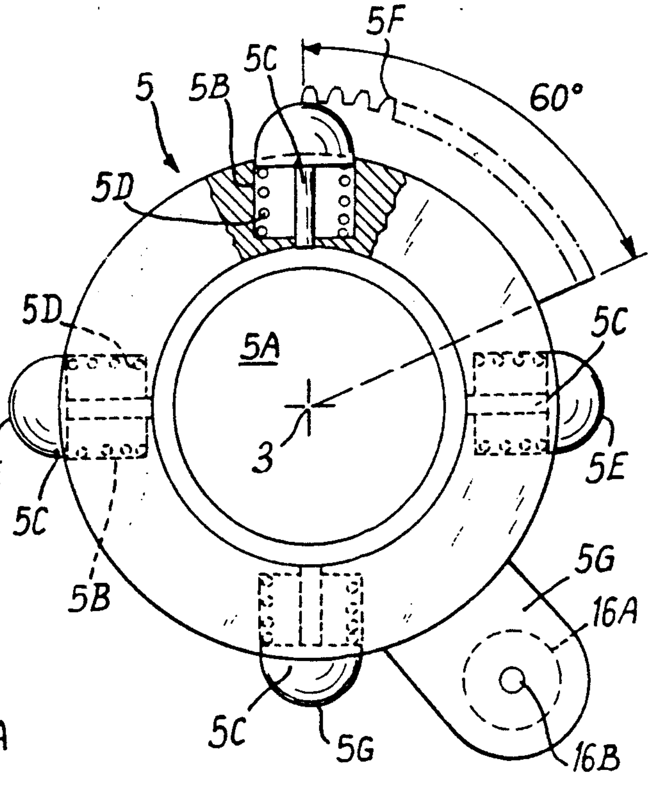
FIG. 5 shows a top view of the first piece partially in section through line V—V of FIG. 4.

Referring to FIGS. 1, 4 and 5, it can be seen that the first cylindrical piece 5 has an axial through passage 5A in which the punch-carrying member 4 can be received. This first piece 5 comprises a set of four radially movable pushers 5C disposed in the same plane, said pushers 5C being able to be brought opposite the chosen set of punches by first actuating means 10.

Pushers 5C, whose number corresponds to that of the punches of each set, are housed in radial passages 5B spaced evenly apart angularly at 90° with respect to each other. A return spring 5D is provided in each radial passage 5B, about the corresponding pusher, so as to allow the pushers to be returned to the extended position, in which the heads 5E of the pushers emerge from the periphery of the cylindrical piece 5. On the other hand, under the action of moving means equipping the second piece 6, the pushers move radially to the retracted position, then causing movement of punches 4.

The first piece 5 allows the set of punches to be used to be chosen, by the first actuating means 10 which are able to rotate the first piece with respect to the punch-carrying member for bringing the pushers opposite the chosen set of punches. For that, in FIG. 1, the actuating means 10 comprise, in this embodiment, an electric motor 10A of stepper type whose drive shaft 10B is fitted with an endless screw 10C cooperating with a toothed sector 5F formed at the periphery of the cylindrical piece 5. Since member 4 comprises three sets of punches offset by 30° with respect to each other, the toothed sector forms at least an angle of about 60° for covering the three sets of punches. It will therefore be understood that, depending on the rotation of the cylindrical piece 5, imposed by the electric motor and the endless screw 10C—toothed sector 5F connection, the set of punches to be used can be readily selected by bringing pushers 5C in correspondence with said set.

Figure 6:
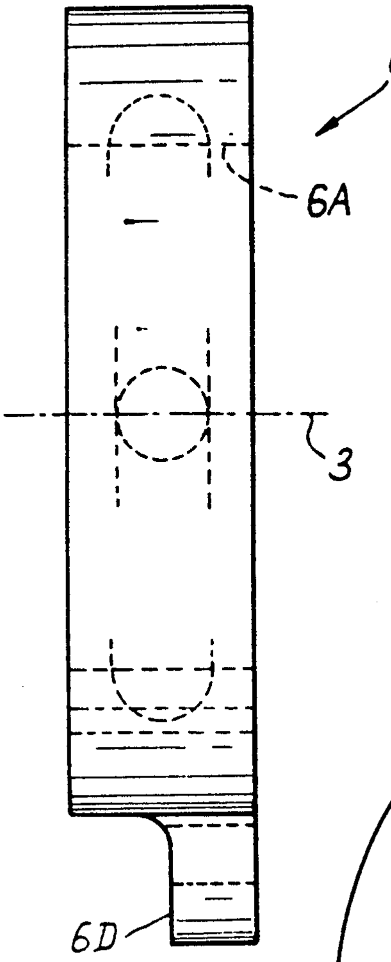
FIGS. 6 and 7 are respectively a side view and a front view of the second piece of the device, which surrounds the first piece.
Figure 7:
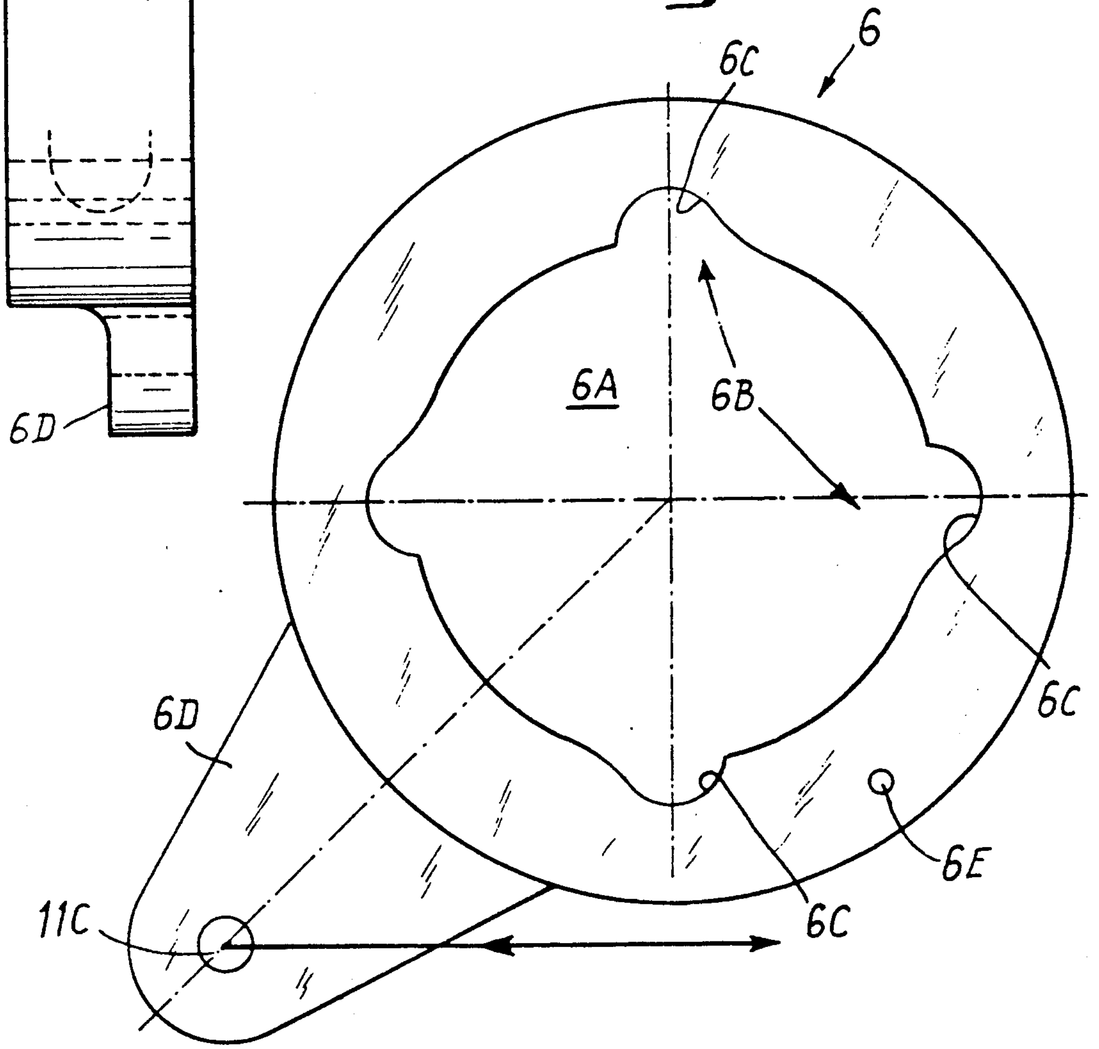

Referring now to FIGS. 1, 6 and 7, it can be seen that the second cylindrical piece 6 has an axial through passage 6A in which the first piece 5 is received, itself receiving member 4, as shown in FIGS. 13 to 16. In the axial passage 6A means 6B are provided for moving the pushers 5C and so the chosen set of punches. These means 6B are advantageously defined by profiled recesses 6C, four in number, disposed at 90° with respect to each other. In these recesses, the heads 5E of pushers 5 are respectively engaged in the extended position In addition, the second cylindrical piece 6 is able to be rotated with respect to the first piece and the punch-carrying member by the second actuating means 11. In this embodiment, these means 11 are formed by a linear electric motor 11A whose sliding rod 11B is mounted by a pin 11C on a radial lug 6D of the second piece 6.

Figure 16:
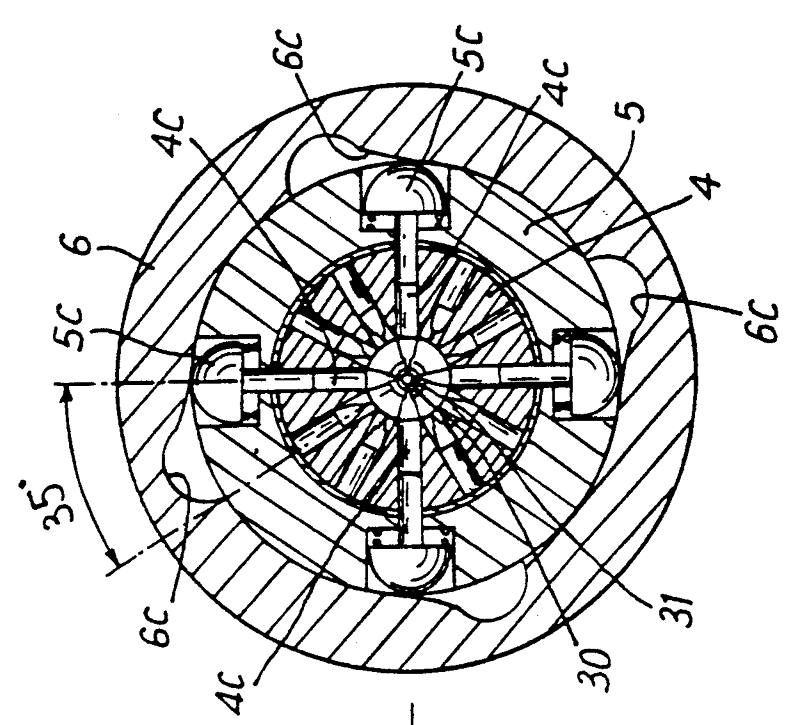
FIG. 16 is a section through line XVI—XVI of FIG. 15 of the device showing, during crimping, the relative positions of the punch-carrying member and of the first and second pieces.

It will therefore be understood that, during rotation of the second piece under the action of the motor 11A, recesses 6C, by pivoting, progressively press the pushers 5C which act on the punches 4C of the chosen set. The crimping imprint obtained at the level of the pin on the conductor depends on the angle of rotation of the recesses on the pushers. A maximum imprint is obtained when the recesses, and so the second piece, have pivoted through an angle of about 35° as shown in FIG. 16. Consequently, the crimping force and the imprint which results therefrom may be adjusted as a function of the angle of rotation of the recesses with respect to the pushers, controlled by motor 11A.

Moreover, the removable locking means 16 of the first and second pieces 5 and 6 comprise an electro-magnet 16A fixed to a radial lug 5G of piece 5 (FIGS. 4 and 5) whose rod 16B can be introduced into a bore 6E formed in the second piece (FIGS. 6 and 7). Thus, when the locking means 16 are active, with rod 16B of the electro-magnet engaged in bore 6E, the pieces 5 and 6 are interlocked for rotation, which makes it possible, by the first actuating means 10, to select the desired set of punches by bringing the pushers into correspondence with the chosen punches.

On the other hand, when the locking means 16 are inactive, the two pieces are no longer locked together for rotation, which then allows the second piece to rotate with respect to the first one and to the punch-carrying member, by the second actuating means and thus, via recesses 6C, crimp the pin on the electric conductor by the corresponding punches.

Referring to FIGS. 1 and 8 to 11, the means 7 for centring the pins with respect to axis 3 comprise two coaxial discs 7A and 7B associated with each other, one of which 7A is fixed whereas the other, 7B, can be driven in rotation about axis 3 via the third actuating means 18. For that, in the embodiment illustrated, means 18 comprise a stepper type electric motor 18A whose drive shaft 18B is connected to a radial lug 7C of disc 7B, by means of a pin 18C.

Figure 8:
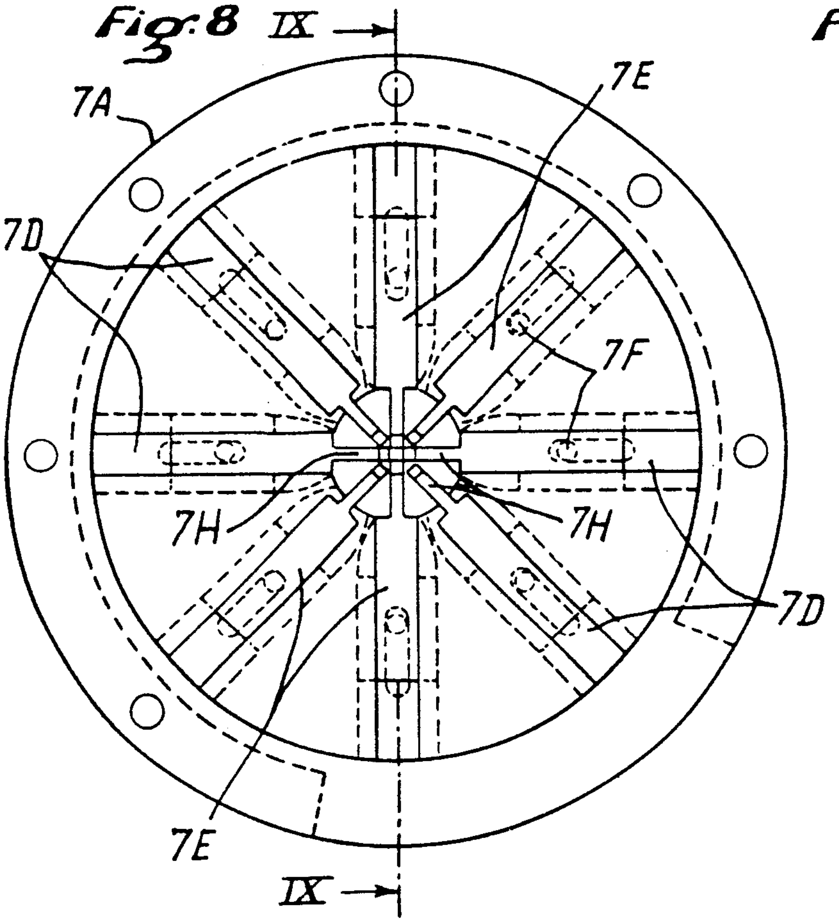
FIG. 8 shows the fixed disc of said means for centring the pins with respect to the punch-carrying member.
Figure 9:
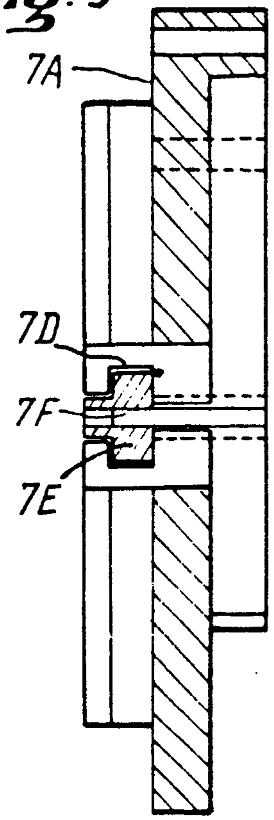
FIG. 9 is a section of the fixed disc through line IX—IX of FIG. 8.
Figure 10:
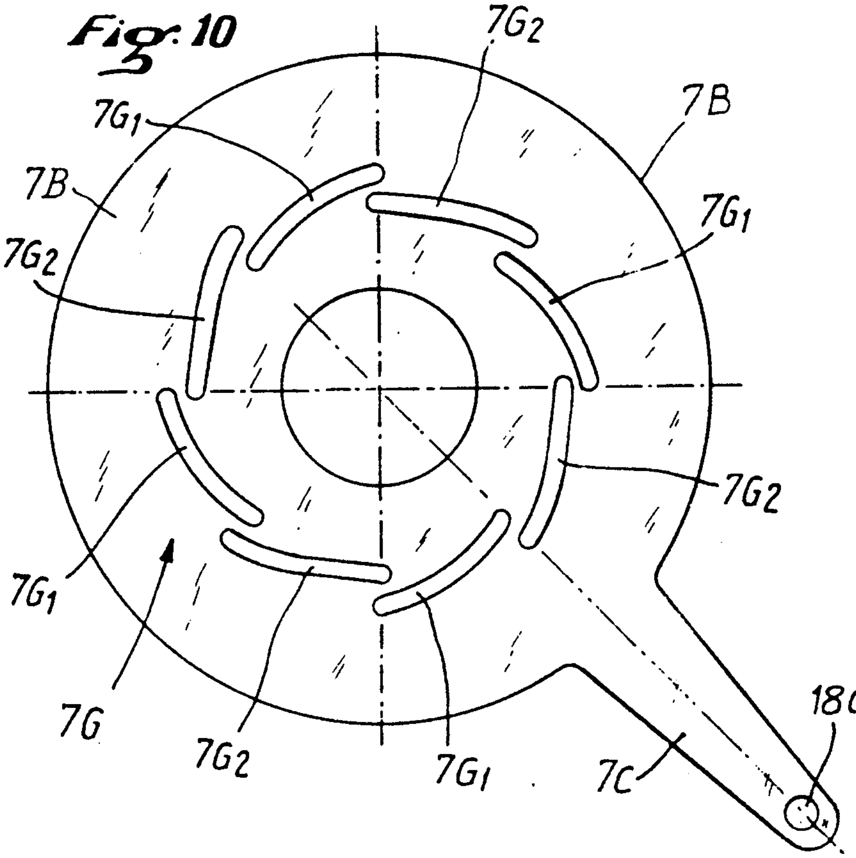
FIGS. 10 and 11 are respectively front and side views of the mobile disc of said means for centring the pins.
Figure 11:
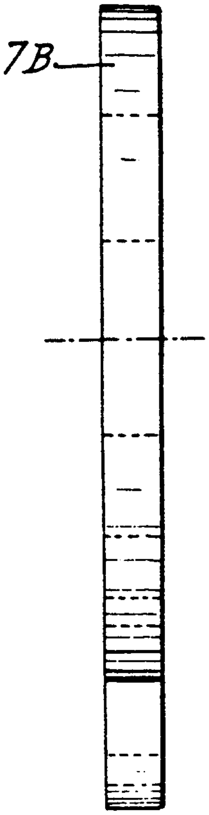

In this example, FIGS. 8 and 9, the fixed disc 7A is provided with eight radial grooves 7D in the form of a T and spaced equally angularly apart. In these grooves 7D elements 7E are able to slide through pins 7F, associated respectively with elements 7E and disposed perpendicularly to grooves 7D, i.e. parallel to axis 3. These pins 7F are further engaged respectively in arcuate apertures 7G formed in the mobile disc 7B. In FIG. 10, it will be noted that two groups of four apertures spaced equally angularly apart are provided, the arcuate apertures $7G_1$ of the first group being more pronounced than those $7G_2$ of the second group. The four apertures $7G_1$ of the mobile disc, in which the respective pins 7F are engaged, under the action of motor 18A and via said pins, allow linear movement of elements 7E in the corresponding grooves 7D of the fixed disc and thus centring, by the thinned ends 7H of elements 7E, of the pins having a diameter between for example 0.5 mm and 4 mm. As for the arcuate apertures $7G_2$, they complete the centring, in an identical way, of the pins whose diameter is between 2 mm and 4 mm. It will therefore be understood that, with these centring means 7, each pin surrounding the conductor is perfectly centred with respect to the punch-carrying member, by at least four of the eight ends 7H of the movable elements 7E spaced equally angularly apart. Moreover, as will be seen during operation of the system, when the pin is centred then introduced under the crimping punches, the ends 7H of the movable elements 7E hold the electric conductor in position.

Figures 12, 13, 14:
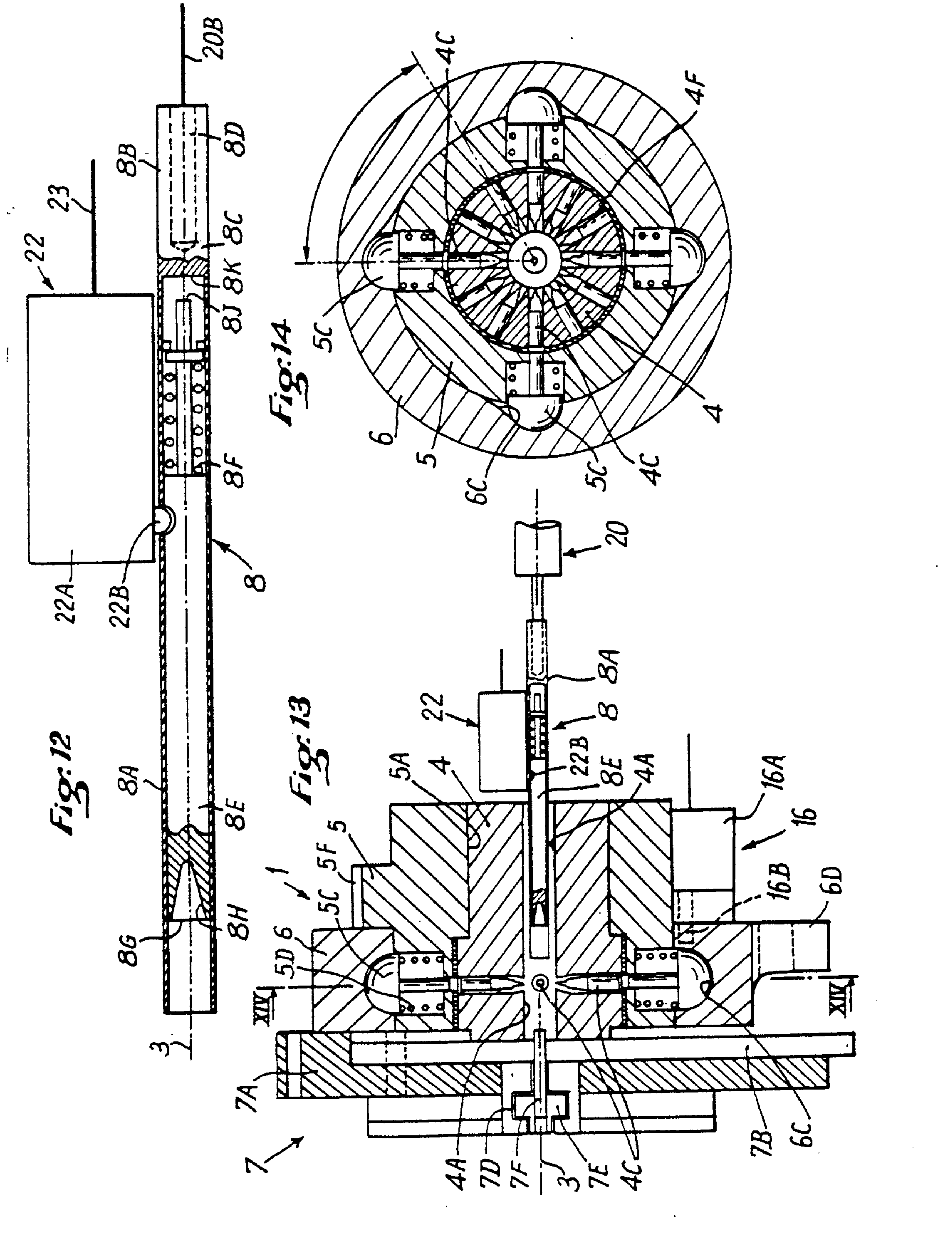
FIG. 12 is a longitudinal section of the means for depth adjustment of the pins with which means are associated for triggering the crimping cycle.
FIG. 13 shows in longitudinal section the device according to the invention before the crimping operation.
FIG. 14 is a section through line XIV—XIV of FIG. 13 of the device, showing the relative positions of the punch-carrying member and of the first and second pieces.

Referring to FIGS. 1 and 12, the means 8 for adjusting the pins in depth, depending on their length, with respect to the punch-carrying member 4, comprise a hollow cylindrical guide 8A closed at one of its ends 8B by a bottom 8C. Guide 8A is intended to be introduced, coaxially with axis 3, in the passage 4A of member 4, by the fourth actuating means 20.

In the embodiment illustrated, these means 20 comprise a linear actuating cylinder 20A of stepper type, whose sliding rod 20B is fixed at its free end in an appropriate bore 8D formed in the bottom 8C of said guide 8A. In FIG. 12 it can be seen that a rod 8E is mounted for sliding in guide 8A while being held in position by a holding spring 8F surrounding a thinned portion of rod 8E. The end face 8G of the rod, turned towards the open end of the guide, is provided with a cone 8H in which the end of the pin can be received, whereas the end face 8J of the thinned portion is able to cooperate with the stop forming face 8K of the bottom 8C of guide 8A.

Thus, depending on the length of the pin, the travel of the guide is adjusted so that, when the stop 8K of guide 8A comes into contact with the end face 8J of rod 8E under the action of cylinder 20A, the shank of the pin is in the desired position with respect to the crimping punches.

Moreover, in FIGS. 1 and 12, the means for triggering the crimping cycle 22, provided on guide 8A, comprise schematically an opto-electronic checking device 22A and a triggering sensor 22B. The latter detect the correct position of the pin as a function of the relative position of the guide and of the rod, and then trigger the crimping operation, after the pin and the conductor have been held in position by the centering means 7 through connection 23.

The operation of the automatic crimping system is the following.

First of all, the control unit 2 contains the references of the markings of the electric conductors to be used, the references of the pins, the dimensional characteristics of the conductor and of the pins as well as the geometry of the pins.

Reading of the marking on the conductor, acquired by the operator, preferably takes place automatically by a bar code reader or a reader of alphanumeric characters marked on said conductor.

Thus, from the reading, the control unit 2 derives the crimping parameters such as the length, diameter and position of the crimping imprints of the pin to be used and such as the diameter of the conductor taken and the depth of the imprints to be formed thereon.

At that time, the operating cycle of the system takes place in the following way:

Locking of the first and second cylindrical pieces 5 and 6 by the electro-magnet 16. This step of the operating cycle corresponds to FIGS. 13 and 14, the crimping device 1 shown comprising the punch-carrying member 4 surrounded by the first piece 5 which is surrounded by the second piece 6. The centring means 7 are disposed at the input of the assembly formed by member 4 and the two pieces 5 and 6, whereas the adjustment means 8 are disposed on the other side of the assembly, guide 8A of means 8 penetrating coaxially into the axial passage 4A of the punch-carrying member 4. Thus, it can be seen that the locking means 16 are active, by interlocking the first and second pieces 5 and 6 for rotation.

Selection of the set of crimping punches by rotation of the two pieces 5 and 6 under the action of motor 10A and the endless screw 10C - toothed sector 5F connection of the first piece 5. Simultaneously, electric pulses are fed to motor 19A for following the movement and the reference alignment for the crimping.

Control cylinder 20A for a adjusting the means 8 (guide 8A, rod 8E) as a function of the length of the pin used, defined by unit 2.

Control of motor 16A acting on the mobile disc 7B of the centring means 7 for drawing the ends 7H of the sliding elements 7E together to the diameter of said pin, via pins 7F transforming the circular movement imposed by the arcuate apertures 7G into a linear movement. All these operations are very rapid, a few tenths of a second are sufficient.

Introduction of pin 30 and setting on the electric conductor 31 in the device.

Detection of the correct position of pin 30 whose end comes into contact with the cone 8H of rod 8E, by sensor 22B.

Holding of conductor 31 in position equipped with pin 30 by the ends 7H of the sliding elements 7E through the electric motor 18A.

Unlocking of the first and second pieces 5 and 6 by retraction of rod 16B of the electro-magnet 16A.

Figure 15:
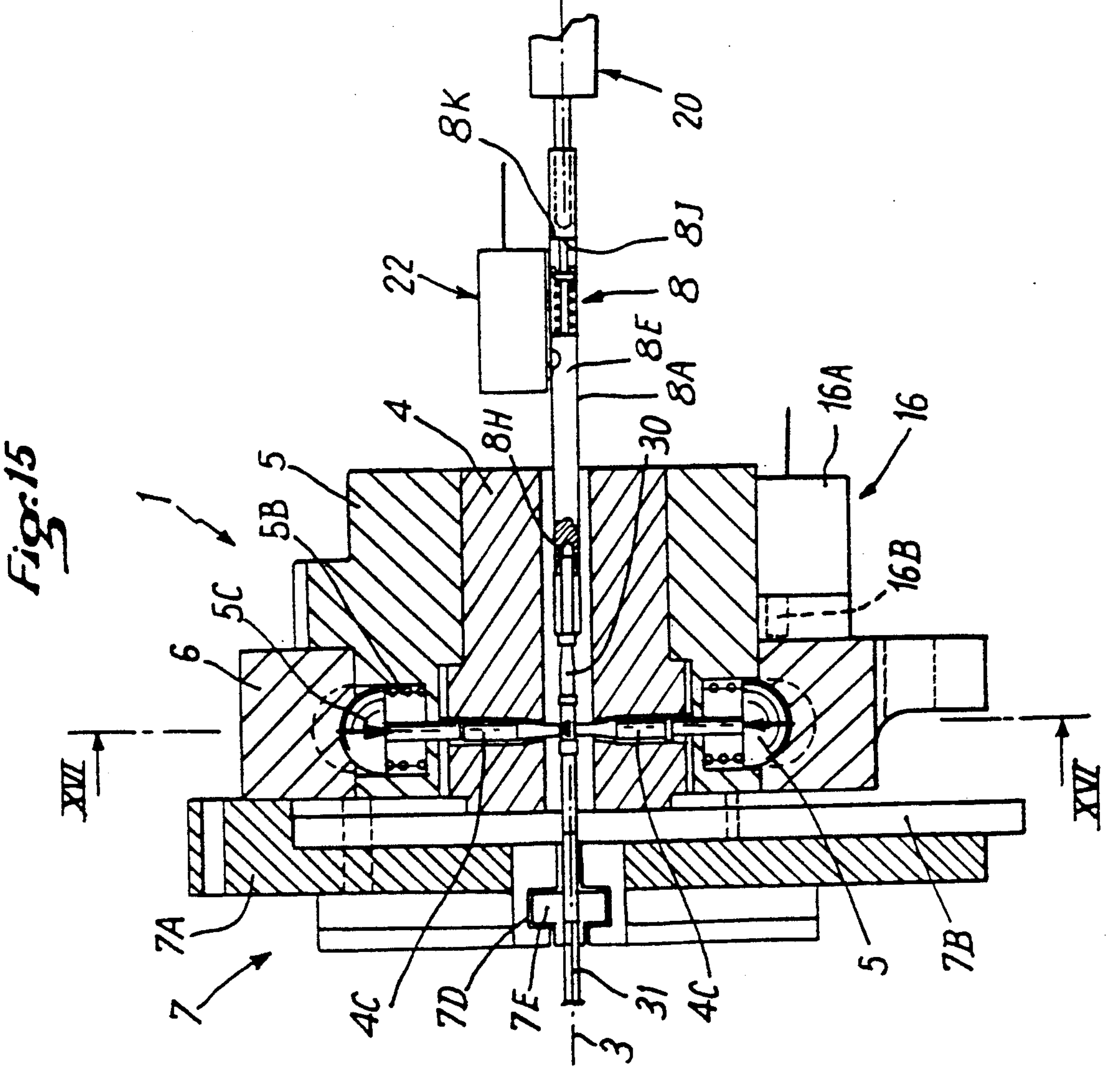
FIG. 15 shows in longitudinal section the device during the crimping operation.

Rotation of the second piece 6 by the motor 11A causing crimping of the pin 30 on the electric conductor 31 by punches 4C. This step of the operating cycle is illustrated in FIGS. 15 and 16. It can thus be seen that rotation of the second piece 6, with respect to the first piece 5 and the punch-carrying member 4, has allowed the recesses 6C to progressively drive pushers 5C of the second piece which, in their turn, act on the punches 4C of the selected set. The ends of the punches act on the shank of pin 30 and crimp the pin on the conductor. The depth of the crimping imprints is adjusted by rotation of the second piece 6 to a greater or lesser extent.

Checking of the crimping force by sensor 25 representing the force to be exerted.

Stopping of crimping properly speaking.

Return to the retracted position of the crimping punches 4C by reverse rotation of the second piece 6, the heads 5E of pushers 5C then being engaged in recesses 6C under the action of springs 5D.

Opening of the centring means 7 by motor 18A, causing the sliding elements 7E to move away from axis 3.

Removal by the operator of the electric conductor 31 with its crimped pin 30.

Return to the initial position of means 8 for the depth adjustment of the pins and of pieces 5 and 6.

The system is then available for a new cycle.

It will thus be understood that with such a system, the risks of error mentioned above are overcome, thus guaranteeing perfect pin-conductor connections.

I claim:

1. Device for crimping connecting elements, such as pins, on electric conductors characterized in that it comprises:

- a punch-carrying member (4) with a plurality of sets of n punches (4C) movable radially with respect to an electric conductor about which a pin to be crimped is disposed;
- a first piece (5) mounted on said punch-carrying member and comprising radially movable pushers (5C), said first piece being movable with respect to said punch-carrying member by first actuating means (10), so as to bring the pushers (5C) opposite a chosen set of punches (4C); and
- a second piece (6) mounted on said first piece (5) and having means (6B) for moving said pushers (5C) representative of the crimping force to be exerted by the punches, said second piece (6) being movable with respect to the first piece and to the punch-carrying member by second actuating means (11), so that the movement means (6B) act on the pushers (5C) which, in their turn, act on the punches (4C) so as to obtain crimping of the pin on the electric conductor.

2. Device according to claim 1, characterized in that said punch-carrying member (4) and said first and second pieces (5 and 6) each have a general cylindrical shape, while being disposed concentrically with respect to each other, said second piece (6) surrounding the first one (5), which surrounds said punch-carrying member (4).

3. Device according to claim 1, characterized in that removable locking means (16) are provided between the first (5) and second (6) pieces for locking the two pieces together, when said locking means are active, for selecting the set of punches by the first actuating means (10) and, when said locking means are inactive, for disengaging the two pieces so as to allow movement of the second piece, by the second actuating means (11), with respect to the first piece and the punch-carrying member.

4. Device according to claim 1, characterized in that the first (10) and second (11) actuating means of respectively the first (5) and second (6) pieces comprise motors of electric type (10A and 11A).

5. Device according to claim 2, characterized in that the rotatory movement of the first piece (5) by the motor (10A) of the first actuating means (10) is achieved by means of an endless screw (10C), connected to said motor and meshing with a corresponding toothed sector (5F) formed at the periphery of said first piece (5).

6. Device according to claim 2, characterized in that the rotary movement of the second piece (6) by the motor (11A) of the second actuating means (11) is achieved by means of a sliding rod (11B) of said motor, connected by its free end and about an axis (11C) to a radial lug (6D) projecting from said second piece.

7. Device according to claim 2, characterized in that the sets ($4B_1$, $4B_2$ and $4B_3$) of punches are disposed in the same radial plane while being evenly spaced apart angularly with respect to each other and in that the the n punches (4C) of each set are also spaced evenly apart angularly from each other.

8. Device according to claim 2, characterized in that the n punches (4C) of each set are housed in respective radial passages (4D) provided in said member (4), said punches being able to occupy a retracted position, through the action of resilient return means (4E), and an extended position under the action of the respective pushers (5C), corresponding to the operation of crimping the pin on the electric conductor.

9. Device according to claim 2, characterized in that said pushers (5C) are housed in radial passages (5B) formed in said first piece (5), said pushers (5C) cooperating, by one of their ends, with the movement means (6B) provided on the second piece (6) and, by their opposite end, with said punches (4C) of the chosen set.

10. Device according to claim 2, characterized in that said means (6B) for moving said pushers and punches are defined by profiled recesses (6C) formed in said second piece (6) and receiving the corresponding ends of said pushers (5C) so that, during the rotary movement of the second piece, the profiled recesses (6C) progressively drive the pushers which act simultaneously on the punches (4C), to produce a crimping imprint which depends on the rotary movement of the recesses on the pushers.

11. Device according to claim 1, characterized in that it further comprises means (7) for centering the pins, as a function of their diameter, with respect to the punch-carrying member, said centering means (7) being controllable under the action of third actuating means (18).

12. Device according to claim 11, characterized in that said centering means (7) comprise two disks coaxial with said punch-carrying member, one (7A) of which is fixed whereas the other (7B) may be movable in rotation by the third actuating means, said mobile disc (7B) being provided with arcuate apertures (7G) in which are respectively engaged pins (7F) of elements (7E) able to slide in radial grooves (7D) formed in the fixed disc (7A).

13. Device according to claim 12, characterized in that two groups of n arcuate apertures are provided, these apertures being spaced apart equi-angularly with respect to each other, the first group of apertures ($7G_1$) ensuring centring of the pins having a diameter between 0.5 mm and 4 mm by the linear movement of the corresponding elements, whereas the second group ($7G_2$) completes guiding and centering of the pins having a diameter between 2 mm and 4 mm by the other elements.

14. Device according to claim 11, characterized in that the third actuating (18) means comprise an electric motor (18A) whose shaft (18B) is connected to a radial lug (7C) extending the mobile disc (7B), via a pin (18C).

15. Device according to claim 1, characterized in that it further comprises means (8) for adjusting the pins in depth, as a function of their length, in the punch-carrying member and controllable by fourth actuating means (20).

16. Device according to claim 15, characterized in that said adjustment means (8) comprise a hollow cylindrical guide (8A) intended to be introduced coaxially, in said punch-carrying member (4), by the fourth actuating means (20), and a rod (8E) disposed inside the guide and having a centring cone for said pins, said guide (8A) being able to slide with respect to said rod so as to come, by a stop (8K) provided in the guide, against said rod (8E) when the adjustment is correct.

17. Device according to claim 16, characterized in that said fourth actuating means (20) are formed by a linear electric motor (20A) whose control rod (20B) is connected coaxially to said cylindrical guide (8A).

18. System for the automatic crimping of connecting elements on electric conductors, characterized in that it comprises:

at least one crimping device comprising a punch-carrying member (4) with a plurality of sets of n punches (4C) movable radially with respect to an electric conductor about which a pin to be crimped is disposed;

a first piece (5) mounted on said punch-carrying member and comprising radially movable pushers (5C), said first piece being movable with respect to said punch-carrying member by first actuating means (10), so as to bring the pushers (5C) opposite a chosen set of punches (4C); and a second piece (6) mounted on said first piece (5) and having means (6B) for moving said pushers (5C) representative of the crimping force to be exerted by the punches, said second piece (6) being movable with respect to the first piece and to the punch-carrying member by second actuating means (11), so that the movement means (6B) act on the pushers (5C) which, in their turn, act on the punches (4C) so as to obtain crimping of the pin on the electric conductor; and a programmable control unit (2) containing the dimensional data and crimping parameters relative to the different types of conductors and pins to be used and to which said actuating means (10, 11, 18, 20), said locking means (16) are connected as well as means (22) for maintaining each pin in the defined position and for triggering the crimping operation according to a programmed cycle.

19. System according to claim 18, characterized in that a sensor (25) representative of the crimping force is associated with the second piece (6) while being connected to said second actuating means (11), so as to interrupt the crimping operation when the force exerted by the punches is reached, an electric connection (26) connecting said sensor to said unit.

* * * * *